April 22, 1958 LE ROI E. HUTCHINGS 2,831,651
SWITCHING DEVICE FOR HIGH TEMPERATURE
MULTI-REACTOR PROCESSES
Filed April 19, 1957 3 Sheets-Sheet 1
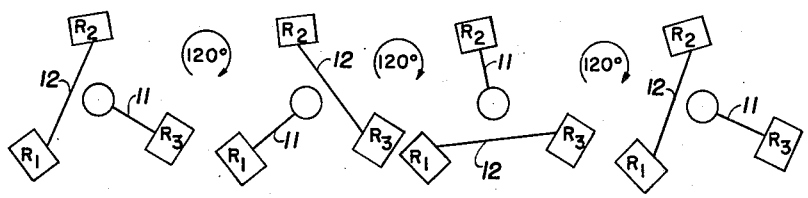
FIG. 1
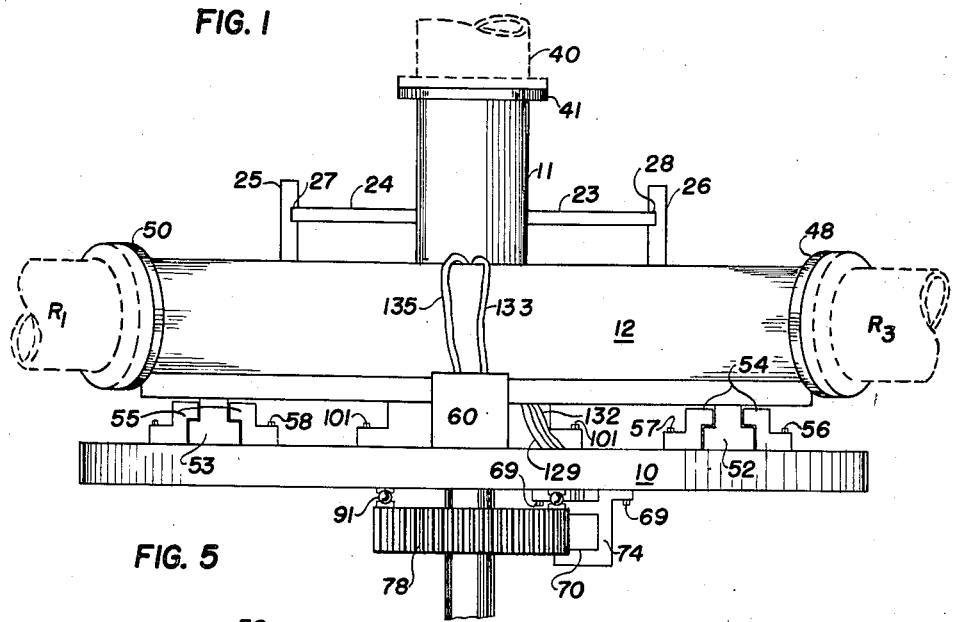
FIG. 5
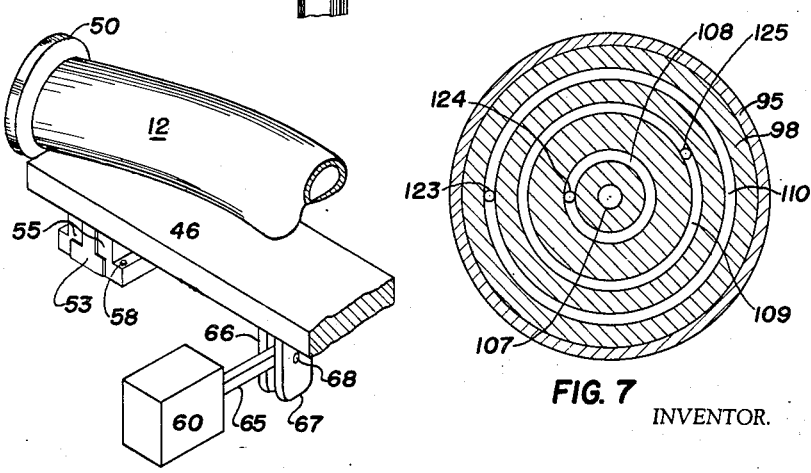
FIG. 6
FIG. 7
INVENTOR.
BY LEROI E. HUTCHINGS
*Edward H. Jung*
ATTORNEY April 22, 1958 — LE ROI E. HUTCHINGS — 2,831,651
SWITCHING DEVICE FOR HIGH TEMPERATURE
MULTI-REACTOR PROCESSES
Filed April 19, 1957 — 3 Sheets-Sheet 2

INVENTOR.
BY LEROI E. HUTCHINGS
ATTORNEY

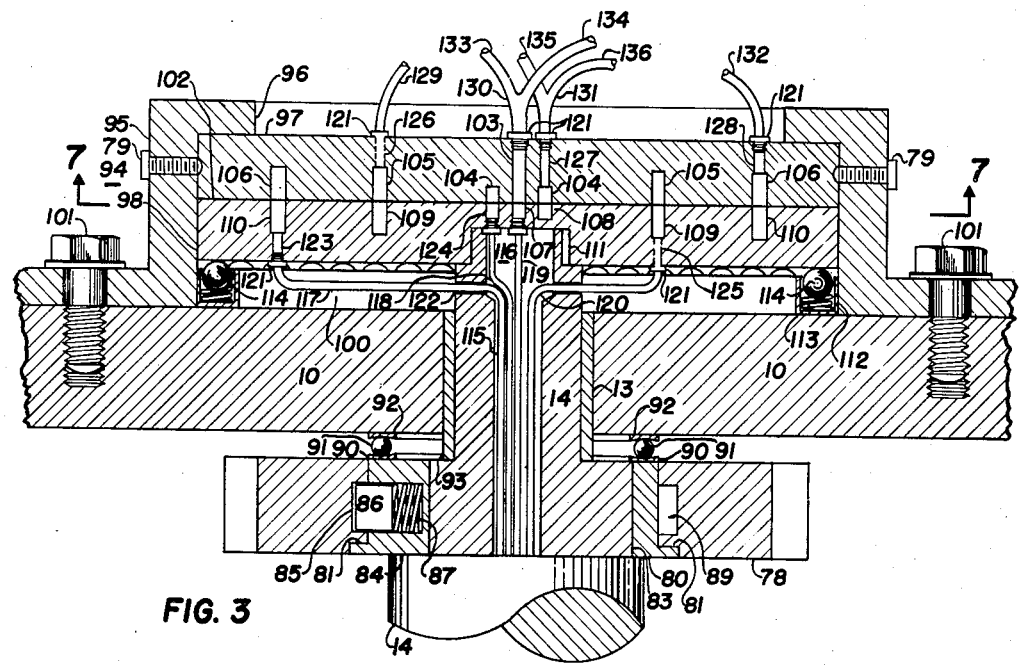

United States Patent Office 2,831,651
Patented Apr. 22, 1958

2,831,651

SWITCHING DEVICE FOR HIGH TEMPERATURE MULTI-REACTOR PROCESSES

Le Roi E. Hutchings, Crystal Lake, Ill., assignor to The Pure Oil Company, Chicago, Ill., a corporation of Ohio Application April 19, 1957, Serial No. 653,947

11 Claims. (Cl. 251—270)

This invention relates to a switching device for use with high temperature multi-reactor apparatus and processes therefor, and, more particularly, to a mechanism for changing the flow path of high temperature fluids between two or more reactors without the use of valves and through the use of rotating and sliding 90° and 120° flanged-elbow conduits adapted to set themselves against apertures within or extending from stationary processing vessels through the use of hydraulic pressure. Another aspect of the invention is to provide a fluid universal by which fluid flow can be transferred from a stationary part to a moving part.

In high pressure catalytic and pyrolytic processes where several reaction vessels are involved and at least one is normally periodically off-stream for some purpose, such as regeneration of the catalyst therein, there exists an extreme problem of controlling the flow of hot fluids through metal conduits or lines. Ordinary gate valves and slide valves requiring the seating of one moveable element upon or against a stationary portion of the valve to effectuate a seal are usually not satisfactory for changing flow paths of liquids, vapors, or gases which are at temperatures greater than about 1500° F. Such ordinary valves are subject to distortion through the extreme heat, erosion of the valve surfaces, and to mechanical failure due to warping and the like. By this invention there has been devised an apparatus whereby the flow of gases or vapors at temperatures above 1500° F. can be controlled and changed without the use of valves. The device comprises briefly a turn-table which can be raised and lowered, and also rotated 360° or more about a vertical axis. The turn-table supports a 90°-elbow conduit and a 120°-elbow conduit. The 90°-elbow conduit is positioned on the table in such a manner that one opening thereof is ajacent the periphery of the table and the other opening is concentric with the center axis of the table. The 120°-elbow is positioned horizontally on the table with both of its openings adjacent to the peripheral edge thereof. One opening of the 90°-elbow is so positioned that in combination with the 120°-elbow their openings at the periphery of the table are about 120° from each other. Both elbows are slideably mounted upon the table so that their flanged edges can be retracted or advanced to engage matching openings in stationary reactors positioned around the table. Accordingly, all that is necessary to operate the device is a remote control system whereby the magnitude and direction of flow of hydraulic fluid to and from the hydraulic piston elements can be used to cause the turn-table to be raised and lowered, and turned on its vertical axis, and the 90°-elbow and 120°-elbow can be retracted or advanced into mating position with the matching openings of the reactor.

It becomes, therefore, a primary object of this invention to provide a switching device for high temperature multi-reactor processes.

A second object of this invention is to provide a device for changing the flow of fluids at high temperatures without the use of valves.

Another object of this invention is to provide a hydraulically operated mechanism for changing the flow through three reactors to bring about sequentially the steps of reaction, regeneration and preheating therein.

Another object is to provide a fluid universal for transmitting the flow of a plurality of streams of fluid from a stationary part to a rotating part.

These and other objects of the invention will become apparent as the description thereof proceeds.

The invention is best illustrated by reference to the drawings in which:

Figure 1 is a diagrammatic illustration showing the sequence of positions through which the device of this invention is turned in connecting three reactors through the steps of reaction, preheating, and regeneration.

Figure 3 is a partial cross-sectional view showing the details of construction of the bearing and ratchet mechanism for turning the table, and also shows details of the fluid differential.

Figure 4 is a cross-section taken along lines 4—4 of Figure 3.

Figure 5 is a side view of the apparatus showing further details of construction and its relative position with respect to the reactors and stack when in closed position.

Figure 6 is a partial cut-away view to show the details of the linkage between the hydraulic mechanism and the 120°-elbow.

Figure 7 is a cross-section along lines 7—7 in Figure 3.

Figure 2:
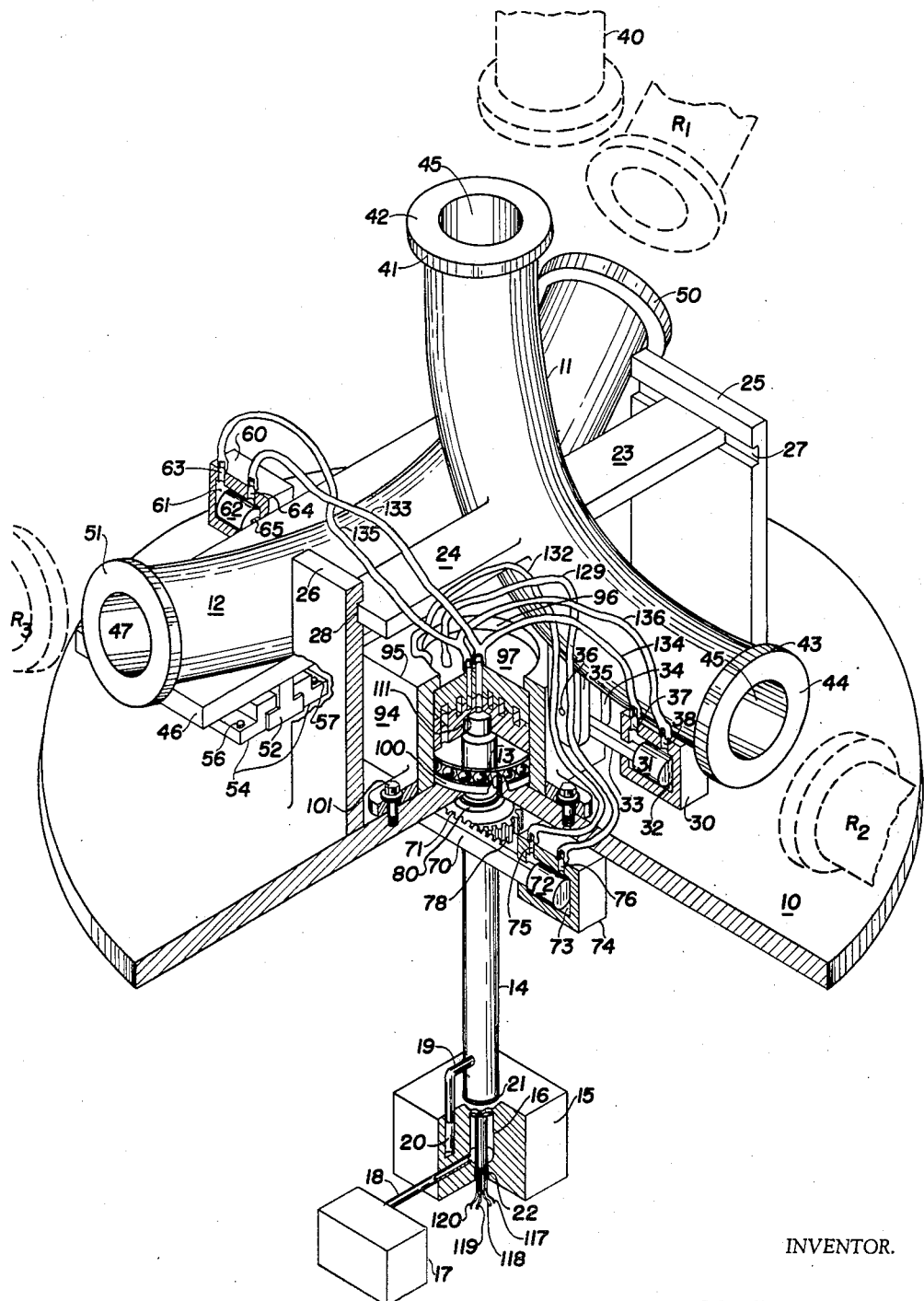
Figure 2 is a perspective view of the apparatus with various parts thereof cut away to show some detailed construction, and the relationship of the device to the reactors and stack with which it is used.

Referring to Figure 1, there is illustrated the sequence of positions #1 through #4, which the switching device of this invention can be caused to take in the course of bringing about the process steps of reaction, preheating, or quenching and regeneration simultaneously in a three-reactor system represented by stationary reactors $R_1$, $R_2$ and $R_3$. In Figure 1, the switching mechanism is represented diagrammatically by 90°-elbow 11 and 120°-elbow 12. The mechanisms for retracting, advancing, raising, lowering, and rotating these elbows to make the sequential connections and disconnections between the reactors and the stack shown in Figure 1 are set forth in the remaining figures of the drawings. The positions of the elbows with respect to one another on the turn table (not shown) are assumed to be fixed in Figure 1, which illustrates only their relative positions with respect to the fixed reactors and stack at the end of each cycle of mechanical movements brought about by the device. Thus, between each of the successive positions the following steps ensue:

(1) The reactors are brought to atmospheric pressure, (2) The elbows are withdrawn horizontally from contact with the reactors, (3) The device is lowered and turned to the next position, and (4) The device is raised and the elbows brought into contact or connection with the reactors. The sequence of processes taking place in the reactors of Figure 1 in accordance with the positions of the switching device are illustrated by the table.

Table

| Position | Reactor Process | | |
|---|---|---|---|
| | $R_1$ | $R_2$ | $R_3$ |
| #1 | Reaction | preheating | regeneration. |
| #2 | Regeneration | reaction | preheating. |
| #3 | Preheating | regeneration | reaction. |
| #4 | Reaction | preheating | regeneration. |

As an example of the application of the invention in the pyrolysis of propane to produce propylene, ethylene and acetylene, pebble beds may be used to carry the necessary heat of reaction and quenching. These pebble beds may be within reactors $R_1$, $R_2$ and $R_3$ of Figure 1. Propane gas is charged to reactor $R_1$ which has previously been regenerated and preheated to about 1400 to 2000° F. The turn-table in "position #1" is shown with elbow 12 connected to reactors $R_1$ and $R_2$, whereby the hot gases leaving reactor $R_1$ are conducted to reactor $R_2$. Reactor $R_2$ has previously been cooled during use as the "No. 1" reactor. While the preheating of reactor $R_2$ is proceeding, the pebble bed in reactor $R_3$ is being regenerated and preheated to about 1500 to 2000° F. for subsequent use as the "number 1" reactor. Elbow 11 serves to conduct the hot gases from reactor $R_3$ to the stack. When the pebble bed of reactor $R_1$ is no longer hot enough to cause pyrolysis of the propane, the flow therein is momentarily interrupted while elbows 12 and 11 are backed off and rotated 120° to "position #2" to connect reactor $R_2$ with reactor $R_3$. Thus, reactor $R_2$ becomes the "number 1" reactor, and reactor $R_3$ becomes the quenching bed. Simultaneously with this change, reactor $R_2$ is connected to vent elbow 11, and regeneration and preheating operations are begun. In "position #3" reactor $R_2$ is undergoing regeneration, $R_3$ is on stream and $R_1$ is the quenching or preheating bed. This cycle of steps is continued in the operation of the device. Obviously, "position #4" is the same as "position #1." These positioning steps are accomplished while the reactors are at atmospheric pressure.

Referring to Figure 2, 10 represents a turn-table which supports the various hydraulic mechanisms operating the 90°-elbow 11 and the 120°-elbow 12 which are slideably mounted thereon. Turn-table 10 is rotatably supported by bushing 13 on stationary shaft 14. Shaft 14 is supported by hydraulic mechanism 15 having hydraulic cylinder 16 operated by source of hydraulic power 17 conducted thereto through conduit 18. Shaft 14 is maintained in non-rotating relationship by means of pin 19, which is fastened thereto and extends within aperture 20 of the body of hydraulic mechanism 15. Shaft 14 is sealed within hydraulic mechanism 15 by means of compression rings 21 and 22.

90°-elbow 11 is fitted with support members 23 and 24, located at approximately the center of balance thereof. Upright members 25 and 26 from table 10 carry horizontal parallel slots 27 and 28, respectively, which serve as sliding guide-means engaging the ends of support members 23 and 24. By this arrangement, 90°-elbow 11 can be caused to slide back and forth along slots 27 and 28 by means of hydraulic mechanism 30. Hydraulic mechanism 30 comprises piston 31 operating in cylinder 32 and connected with rod 33. Rod 33 connects to downwardly extending, spaced lobes 34 and 35 by means of pin 36 extending therethrough. Lobes 34 and 35 attach to the bottom center of 90°-elbow 11. Hydraulic mechanism 30 is provided with ports 37 and 38 for the entry of hydraulic fluid into cylinder 32 on either side of piston 31.

In Figure 2, the stationary flanged openings leading to reactors $R_1$, $R_2$ and $R_3$ (so designated on the drawing) and stationary stack 40 are shown in dotted lines. Elbow 11 has upper flange end 41 with surface 42 machined to form a smooth seat against a similar opposing flange surface presented by stack 40. Likewise, the lower end of elbow 11 is equipped with flange 43 having smooth, machined surface 44. The opening through elbow 11 is represented by 45. Elbow 11 is positioned on the turn-table so that when it is mid-way along its horizontal path, as determined by piston 31, rod 33, and the linkage therewith, the upper center of opening 45 is approximately in the center of table 10 and shaft 14.

The 120°-elbow 12 lies parallel to the plane of table 10 and is attached to supporting plate 46. Elbow 12, like elbow 11, has opening 47 therethrough and is equipped with flanged ends 48 and 50. The machined surface of flanged end 48 is indicated at 51.

Plate 46, along with elbow 12, is slideably mounted on table 10 by means of T-members 52 (see also Figures 5 and 6) and 53 held in place by pairs of guide-members 54 and 55 held to plate 10 by means of bolts, as indicated at 56, 57 and 58. T-members 52 and 53 rest upon table 10 to form a bearing surface therefore as elbow 12 is moved in a horizontal plane. This movement of elbow 12 is brought about by means of hydraulic mechanism 60 which, like hydraulic mechanism 30, has cylinder 61, piston 62, ports 63 and 64, and arm 65. The details of the connection of arm 65 to plate 46 are shown in Figure 6 wherein lobes 66 and 67 attach to plate 46 and support pin 68, to which arm 65 is attached.

Thus far in the description of the invention the means for raising and lowering the switching device, namely hydraulic mechanism 15 and shaft 14, and means for slideably moving elbows 11 and 12, have been described. In order to accomplish the connection of the device to reactors $R_1$, $R_2$ and $R_3$ in the sequence described in connection with Figure 1, it is necessary that table 10 rotate. The means for rotating table 10 comprises rack member 70, having gear teeth 71, connected to piston 72. Piston 72 operates within cylinder 73 of hydraulic mechanism 74 having ports 75 and 76.

Movement of piston 72 causes rack 70 through gears 71 to engage spur gear 78. Spur gear 78 (see Figures 3 and 4) is rotatably carried by sleeve 80 by means of peripheral bearing-shoulder 81. Sleeve 80 is non-rotatably mounted on shaft 14 by means of flat segment 82 between the contacting surfaces 83 of shaft 14 and sleeve 80. Other arrangements for securing collar 80 to shaft 14 in non-rotatable relationship may be used, such as a key or a bolt, or by having surface 83 square. Bearing-shoulder 84 supports sleeve 80 on shaft 14. Sleeve 80 has recess 85 housing dog or reciprocating catch member 86 forced outwardly by spring 87. Dog 86 is adapted to engage a series of cog-teeth 88 on the inner peripheral surface of spur gear 78. End-surface 90 of dog 86 is curved to conform with the curve of cog-teeth 88. By this arrangement, spur gear 78 may rotate in one direction (counter clockwise as viewed in Figure 4) but may not rotate in the other direction because of the action of spring 87 and dog 86. Accordingly through this ratchet mechanism, since collar 80 is non-rotatably mounted on shaft 14, rack 70 and gear teeth 71, upon being given an oscillating movement by piston 72, it will push table 10 around shaft 14 carried by bearing 13. The rotation may be in either direction depending on the direction of cog-teeth 88 and dog 86. The engaging surface of the cog-teeth are indicated at 89. Additional support and bearing surface for table 10 is provided by collar 80 carrying bearing race 90 and ball bearings 91. Opposing bearing race 92 attached to table 10 completes this main bearing support. Shoulder 93 carries bearing 13 in position around shaft 14.

Between non-rotating shaft 14 and rotating table 10, which carries the hydraulic mechanisms 30, 60 and 74, a fluid universal indicated at 94 is provided (Figures 1 and 3). Fluid universal 94 comprises housing 95, having opening 96 (Figure 3), plates 97 and 98 and thrust bearing 100. Housing 95 is held to table 10 by means of bolts 101. Plates 97 and 98 form a fluid-tight seal along their opposed, machined surfaces as indicated at 102.

Plate 97 has central aperture 103 and concentric, circular grooves 104, 105 and 106 which extend through machined surface 102. Similarly, plate 98 has central aperture 107 and concentric, circular grooves 108, 109 and 110. The grooves on one plate match with the grooves on the other plate so that the outer grooves 106 and 110 form a continuous circular passageway, intermediate grooves 105 and 109 form a continuous intermediate circular passageway, and grooves 104 and 108 form an inner continuous circular groove. The matching central apertures, 103 and 107, form a central passageway through contiguous, sealed surface 102 of the plates.

Plate 97 rotates with housing 95, and table 10, etc., under the impetus of hydraulic system 74. To accomplish this action, plate 97 is held within housing 95 by means of bolts 79 shown only in Figure 3, or may have a square periphery to fit into a corresponding square recess in the upper part of housing 95. Plate 98 is affixed in non-rotating relationship to shaft 14 as at key 111, or by means of forming the top of shaft 14 square or octagonal to fit tightly into a corresponding recess in plate 98. Thrust bearing 100, comprising retainer 112 confining a plurality of springs 113 and ball bearings 114, holds stationary plate 98 against rotating plate 97 during rotation of table 10.

Shaft 14 is provided with central passageway 115 leading to opening 116 to accommodate hydraulic tubes 117, 118, 119, and 120. Threaded nipples 121 are used to connect the tubes to plate 98. Hydraulic tube 117 passes through passageway 122 in the wall of opening 116 of shaft 14 and connects to passageway 123 which communicates with grooves 110 and 106. Tube 118 connects through passageway 124 to grooves 108 and 104. Tube 119 connects directly to central apertures 107 and 103. Tube 120 connects through passageway 125 to grooves 109 and 105.

The grooves of plate 97 are similarly connected by means of passageways and suitable nipples to hydraulic fluid tubes leading to the hydraulic mechanisms to move elbows 11 and 12 and rotate the table 10. Accordingly, apertures 126, 127 and 128, threaded nipples 121, and tubes 129, 130, 131 and 132 connected thereto are provided. Tubes 130 and 131 form branch tubes 133, 134, 135 and 136. Hydraulic fluid can therefore be caused to flow in both directions through the tubes at the bottom of hydraulic system 15 (Figure 1) in shaft 14 into the passageways, around the grooves of the contiguous plates, and out the upper passageways and tubes, even though plate 97 may be rotating with respect to plate 98. The course of hydraulic fluid through one tube within shaft 14 to its companion tube on the rotating plate will be followed as illustrative of the function of the balance of the tubes. Fluid can be caused to pass from a source of hydraulic pressure (not shown) through tube 117 through the base of hydraulic mechanism 15 into passageway 123 which leads to circular groove 110—106. The fluid passes around groove 110—106, sealed by surface 102, until it reaches passageway or bore-hole 128 and passes into tube 132 attached thereto. This would move piston 72 to the right and rotate gear 78 on collar 80.

At the same time a reverse flow of fluid will be taking place through passageway 76, tube 129, bore 126, groove 105—109, bore 125, and tube 120. A similar flow of hydraulic fluid takes place in the other tube, groove and passageway combination. A simple control panel (not shown) comprising manually or electrically operated valves is contemplated for use with the device to accomplish the coordinated movement of the pistons through this system of hydraulic conduits. The valves may be two-way valves, connected so that opening one valve to hydraulic pressure, as on tube 117, closes the connection of tube 120 to hydraulic pressure and opens a port therein so that piston 72 can move and force the fluid out. The reverse movement is accomplished by closing the port in tube 120, and opening the two-way valve to hydraulic pressure, while at the same time shutting off tube 117 from the source of hydraulic pressure and opening the exhaust port of the two-way valve. This would cause hydraulic fluid to move piston 72 to the left and ratchet 74 to engage gear 78. Since dog 86 holds gear 78 from turning on shaft 14, table 10 will be forced to move counter-clockwise. Repeated reciprocation of this cycle will cause table 10 to rotate around shaft 14. The flow of fluid to one side or the other of piston 31 to move elbow 11, or piston 62 to move elbow 12, need only be an inlet and exhaust cycle since the sliding movements of elbows 11 and 12 is governed directly by the backward or forward movements of the respective pistons. The cross-section in Figure 3 is shown as cutting through passageways 123, 107—103 and 128, but not cutting through passageways 126 and 125 since these passageways may be located anywhere along the length of the grooves.

Certain of the details shown in Figures 3–7 are not reflected in Figure 2 in order to simplify the drawing. Thus, threaded nipples, like 121 described in connection with Figure 3, would be used to attach the various hydraulic conduits to plate 97 in Figure 1 and also the hydraulic units 30, 74 and 60. Figures 5, 6 and 7 show details of construction that are not shown in Figures 2, 3 and 4. The details of recess 116 in shaft 14 are not shown in Figure 2, same being better shown in Figure 3. Also, the details of plates 97 and 98, and the grooves and bore-holes therein, are better explained in Figures 3 and 7. Rack 70 is omitted from Figures 3 and 4 but is shown in Figure 5. Figure 5 also shows the manner of attachment of hydraulic unit 74 to table 10, as by means of bolts 69, not shown in Figure 1.

Various modifications may be made in the device without departing from the invention. Ball bearings 91 may be roller bearings or a solid bearing. Various parts may be welded together instead of bolted.

The flanged surfaces 42, 44, and 51 need not be circular in shape as long as they present a flat, machined, fluid-sealing surface. Elbows 11 and 12 need not be continuous curves or parts of a circle, although this configuration forms the most simple embodiment as far as fabrication of the parts is concerned. Plate 46 is not essential to the construction, and T-shaped legs 52 and 53 may be fastened directly to the 120°-elbow conduit 12. The peripheral edge of platform 10 may be any desired shape. Removable stops may be in grooves 27 and 28 of supports 25 and 26 so that elbow 11 can not be run off its support. Other modifications will become apparent to those skilled in the art without departing from the invention.

From this description it is seen that a switching device is provided whereby three fixed reactors having flanged openings arranged symmetrically around and spaced from the flanged opening of a fixed stack can be connected and disconnected in sequence in such a manner that one of the reactors is receiving the effluent from the other for purging or preheating, and the third reactor is connected to the stack, as during regeneration. The device is applicable to many types of chemical and physical transformations involving reaction, regeneration and purging or preheating in sequential steps. These may include cracking, isomerization, polymerization, thermal decomposition, alkylation and hydrogenation reactions, whether conducted with or without a catalyst or with fixed-bed or fluid-bed techniques. Although the device is shown for use in an upright position with the elbow conduits on the top side of the platform, it may also be used with the platform in a vertical position (shaft 14 being horizontal) or with the elbows on the bottom side of the platform.

Any suitable mechanism may be used to fix the degree of movement of the rack relative to the pinion. One such means is to have the number of teeth in the pinion divisible by three so that a single stroke or a multiple number of full or part strokes gives an exact amount of movement, e. g., 120°. A second means is to locate a switch operating on the hydraulic mechanism, said switch being activated when the table has reached a certain position. This permits the rack to operate in any fashion because the table is positioned by means of the switch. The switch is automatically reset following the completion of the cycle. Other aligning devices, such as pins and holes, can be used to further align the table with respect to the reactors.

What is claimed is:

1. A switching device for high temperature reactors being operated in sequence comprising, in combination, a first conduit means having valve-seating flanges at its open ends, a second conduit means having valve-seating flanges at its opened ends, said conduit means being supported on a movable platform, means for advancing said conduit means individually on said platform to bring said flanges into contact with corresponding flanges on said reactors, means for retracting said conduits to remove said flanges from contact with the flanges of said reactors, means for advancing and retracting said platform on an axis perpendicular to the plane of movement of said conduits and means for rotating said platform whereby said conduits can be connected in sequence to said reactors.

2. A switching device for high temperature reactors being operated in sequence comprising, in combination, a first conduit means comprising a 120°-elbow having valve-seating flanges at its open ends, a second conduit means comprising a 90°-elbow having valve-seating flanges at its open ends, said conduit means being supported on a movable platform, means for advancing said conduit means individually on said platform to bring said flanges into contact with corresponding flanges on said reactors, means for retracting said conduits to remove said flanges from contact with the flanges of said reactors, means for advancing and retracting said platform on an axis perpendicular to the plane of movement of said conduits and means for rotating said platform whereby said conduits can be connected in sequence to said reactors.

3. A switching device for high temperature reactors being operated in sequence of reaction, regeneration and purging comprising a platform mounted on a supporting shaft, means for raising and lowering said shaft and platform, means for rotating said platform independent of said shaft, a first conduit means comprising a 120°-elbow having valve-seating flanges at its ends, said 120°-elbow being slideably attached to said platform so that the curved central axis thereof is parallel to the surface of said platform and the flanged ends thereof are adapted to contact opposing flanged parts of two spaced reactors simultaneously, a second conduit means comprising a 90°-elbow having valve-seating flanges at its ends, said 90°-elbow being slideably mounted on said platform so that one flanged surface is normal to said platform and the other flanged surface is parallel to said platform whereby said latter flanged surface can be brought into sealed relationship with a central stack having its axis coincident with said supporting shaft and the other flanged surface can be brought into sealed relationship with a third reactor.

4. A switching device in accordance with claim 3 in which said means for rotating said platform comprises a cylinder attached thereto, a piston within said cylinder, ports leading to said cylinder on each side of said piston, a rack connected to said piston, said rack engaging a spur gear, said spur gear having an internal annular rack, and being supported on a collar non-rotatably mounted to said shaft, a recess in said collar, a spring-actuated catch means within said recess, said catch means adapted to engage said annular rack to allow said spur gear to rotate in only one direction, a source of hydraulic power to cause said piston to reciprocate in said cylinder to thereby force said platform to rotate on said shaft.

5. A switching device in accordance with claim 3 in which each of said elbows is attached to a rod and hydraulically actuated piston, and means are provided for conveying a hydraulic fluid thereto to advance and retract said elbows.

6. A switching device in accordance with claim 3 in which the means for rotating said platform and the means for moving said elbows are hydraulic, and the conduits conveying fluid pressure to and from said hydraulic system pass through said shaft into a fluid universal adapted to pass fluid from a non-rotating part to a rotating part.

7. A switching device in accordance with claim 6 in which said fluid universal comprises an open-topped housing mounted to said platform over the end of said shaft, a pair of plates held within said housing, said plates having opposed sealing surfaces, a plurality of spaced concentric grooves within said sealing surfaces, an aperture leading from the top of said top plate into each of said grooves, an aperture leading from the bottom of said bottom plate into each of said grooves, and means for attaching said fluid conduits to said apertures, said bottom plate being fixed to said shaft and free to rotate within said housing, and said top plate being rotated with said housing and said platform.

8. A switching device comprising in combination, a base member, a cylinder bore in said base member, a supporting shaft extending from said cylinder bore in liquid-sealed, reciprocating, non-rotating relationship, a source of hydraulic fluid pressure connected to said cylinder bore, a series of shoulders defining progressively more narrow portions on the extending end of said supporting shaft, an intermediate shoulder supporting a rotatable platform on a sleeve-bearing encompassing said associated narrow portion of said shaft, an adjacent shoulder supporting a collar in non-rotating relationship on said shaft, a ring gear rotatably carried on a peripheral shoulder of said collar, said ring gear having outer peripheral spur gear teeth and inner peripheral ratchet teeth adjacent the outer surface of said collar, a transverse recess in the outer surface of said collar, a spring-actuated catch in said recess, said catch adapted to engage said ratchet teeth to allow the rotation of said ring gear in one direction only on said collar, said shaft extending beyond said platform surface to form a terminal shoulder and associated narrow portion thereof at its end, a first valve-plate affixed to said narrow portion of said shaft, a recess in the end of the shaft, said recess connecting to a central passageway leading through the supported end of said shaft within said base member, said passageway being connected to a conduit leading through said base member, a thrust-bearing forcing said first valve-plate against a second valve-plate, an open-topped housing attached to said platform and encompassing said valve-plates and said thrust-bearing, said second valve-plate being affixed to said housing and rotatable with said platform, said first and second valve-plates presenting to each other a flat, machined, liquid-sealing surface, at least three pairs of matching, concentric, circular grooves in said machined surfaces of said valve-plates, a central matching aperture in said valve-plates, an aperture leading from the bottom of each groove to the opposite side of the plate from the machined surface thereof, a conduit for hydraulic fluid leading from each aperture of the first valve-plate into said terminal recess and through said central passageway at the base-member end of said shaft, a conduit for hydraulic fluid leading from each aperture of said second valve-plate through the open top of said housing, a pair of spaced, opposed, parallel-grooved supports on each side of said housing on said platform, a transverse arm engaging said grooves in said supports in a slideable relationship at the ends thereof, a 90°-elbow mounted on said arm, said 90°-elbow having transverse flange seats at each end thereof, said 90°-elbow conduit being positioned on said arm so that one of its flange seats is movable to a position substantially coincident with the central portion of said platform, a 120°-elbow conduit having transverse flange seats at each end thereof and being fastened to a plate extending substantially along its longitudinal axis, said plate having terminal T-shaped legs engaging guide means on said platform, hydraulic means attached to each of said elbows whereby each is movable parallel to said platform and the flange seats of said 120°-elbow move into a position 120° along the periphery of said plate from the position of the other end of said 90°-elbow whereby said flange seats adjacent the platform periphery are brought into sealed relationship with corresponding flanged openings leading to three fixed reactors, and simultaneously the central flange of said 90°-elbow is brought into sealed relationship with the flanged inlet of a fixed stack, and means attached to said hydraulic fluid conduits for controlling the magnitude and direction of flow of said hydraulic fluid therein.

9. A switching device in accordance with claim 8 in which said collar is spaced from said platform, said collar and the adjacent surface of said platform carries a bearing race and said platform is supported by bearings within said race.

10. A switching device for use with three fixed reactors having flanged openings arranged symmetrically around and spaced from the flanged opening of a substantially vertical, fixed exhaust stack whereby two of said reactors are connected in sequence to each other and at the same time the third reactor is connected to said fixed exhaust stack in a sequence of reaction, regeneration and preheating cycles comprising, in combination a 90°-elbow conduit having valve-seating flanges at its open ends, a 120°-elbow conduit having valve-seating flanges at its open ends, a rotatable platform supporting said elbow conduits, said 90°-elbow conduit being slideably affixed to said platform in an upright position so that one of said flanged ends is positionable at a point substantially coincident with the center of said platform and its other flanged end is positionable at a point adjacent the periphery of said platform, said 120°-elbow conduit being similarly slideably affixed to said platform so that each of said flanged ends is positionable at a point 120° from the flanged end of said 90°-elbow conduit and the periphery of said platform means for raising and lowering said platform, and means for advancing and retracting said elbows.

11. A device for transmitting a fluid in a plurality of individual streams from a stationary part of an apparatus to a rotating part thereof, comprising, in combination, a stationary non-rotating shaft, a platform rotatably mounted on one end of said shaft, said shaft extending part way through said platform, said platform supporting at least one member to which fluid is to be transmitted and returned, a housing on said platform, said housing surrounding the protruding end of said shaft, a thrust-bearing within said housing, a lower valve-plate affixed to the protruding end of said shaft and borne by said thrust-bearing, an upper valve-plate in juxtaposition with said lower valve-plate along machined flat surfaces thereof, at least one matched pair of coincident grooves in the opposed machined surfaces of said valve-plates to form a continuous, fluid-sealed, circular conduit therebetween, an aperture through each of said valve-plates and communicating with the corresponding groove, fluid conduit means attached to said aperture of said lower valve-plate and connected through said shaft, fluid conduit means connected to said aperture of said upper valve-plate and connected to said member to which fluid is to be transmitted, and means to hold said upper valve-plate within said housing so as to rotate with same and said platform.

References Cited in the file of this patent
FOREIGN PATENTS
685,885    Great Britain _____ of 1950